Dec. 1, 1942. W. H. BENNETT 2,303,321
METHOD AND APPARATUS FOR DISCHARGING ELECTRICITY
Filed March 7, 1941  2 Sheets-Sheet 1

INVENTOR
WILLARD H. BENNETT
BY Charles B. Belknap
ATTORNEY

Dec. 1, 1942.  W. H. BENNETT  2,303,321

METHOD AND APPARATUS FOR DISCHARGING ELECTRICITY

Filed March 7, 1941  2 Sheets-Sheet 2

INVENTOR
WILLARD H. BENNETT
BY Charles B. Belknap
ATTORNEY

Patented Dec. 1, 1942

2,303,321

UNITED STATES PATENT OFFICE 2,303,321

METHOD AND APPARATUS FOR DISCHARGING ELECTRICITY

Willard H. Bennett, Newark, Ohio, assignor to Slayter Electronic Corporation, Newark, Ohio, a corporation of Ohio Application March 7, 1941, Serial No. 382,221

11 Claims. (Cl. 175—264)

My invention relates to a method and apparatus for neutralizing charges upon charged objects and is a continuation in part of my copending application, Serial No. 299,018, filed October 11, 1939.

The presence of charges upon charged objects is commonly referred to as static electricity. It is well established that bodies moving through or over a medium may collect a static charge of electricity which discharges into the surrounding medium when the potential gradient at the body in the medium becomes sufficiently great. This discharge of static charge from a body presents serious problems in the operation of aircraft and in the operation of industrial equipment of the type requiring an orderly arrangement of the products passing therethrough. The effect of static discharge from radio-equipped aircraft is particularly critical in that it not only impairs navigation of the aircraft by rendering the radio useless, but frequently reaches such proportions as to actually burn holes in parts of the aircraft. In the case of industrial machinery, the discharge of static charges causes a disarrangement of the product passing through the machinery and thereby interferes with the operation of the machinery.

It has been proposed to eliminate the above objections by creating a discharge between an emitting electrode and a collecting electrode located in the vicinity of the object affected by the static charge. Apparatus employed in the past for this purpose has not been successful because of the inability of such apparatus to control the discharge between the electrodes so that this discharge is maintained below sparking, arcing or streamering conditions throughout continuous operation.

The use of any apparatus which creates a streamering or channeled type of discharge is particularly unsatisfactory for removing static charges from or neutralizing static charges on radio equipped aircraft or in the vicinity of combustible mixtures and ignitable materials. This is true because streamering or channelled types of discharges create just as much radio interference as the discharge from the plane itself and tends to produce sparks or arcs in the vicinity of gasoline vapor fumes which is obviously hazardous. It may also be pointed out that the use of apparatus which sparks or arcs for the removal of static charges from objects in the process of manufacture is objectionable because it not only creates a fire hazard but, also, generates a very large amount of ozone which may injure the object whose charges are to be neutralized.

The present invention contemplates overcoming the above objections by providing an electric discharge device which not only neutralizes the charge between a body and the surounding medium but, in addition, accomplishes this result by controlling the discharge between the electrodes so that this discharge is maintained below sparking, arcing or streamering conditions throughout continuous operation. In accordance with this invention, the discharge between the electrodes is controlled in such a manner that this discharge is delivered in substantial quantities to the surrounding medium in a diffused and approximate uniform manner in only one polarity at a time.

A number of features of the apparatus may operate singularly or collectively to obtain the desired controlled discharge between the electrodes, and the following are important for this purpose:

(a) Using emitter points which are of uniformly small tip diameter.

(b) Employing a series resistance with each emitter point.

(c) Constructing the collecting electrode so that the field at any one spot on its surface is relatively small.

(d) Proper location and spacing of the electrodes.

It is a further object of this invention to neutralize static charges on objects by providing an electric discharge device of the type set forth with an electric field between the electrodes in the vicinity of the object to be discharged and effecting the availability of electrical charge from that field in an amount sufficient to neutralize the electrical charge on the object.

A still further object of this invention is to provide an electric discharge device for producing an electric discharge alternating in polarity which will neutralize a charge of either polarity equally as well.

A still further feature of this invention is to provide an electric discharge device wherein the charges of opposite polarity are equalized. In accordance with this invention, the charges of opposite polarity are equalized by connecting a condenser in the circuit including the electrodes.

The foregoing as well as other objects will be made more apparent as this description proceeds, especially when considered in connection with the accompanying drawings, wherein.

Although the present invention may be advantageously used in connection with practically any object subject to static charges for neutralizing those charges, nevertheless, I have selected two specific embodiments for the purpose of illustration. In Figures 1 to 5, inclusive, I have shown the invention as applied to aircraft and in Figure 6, I have illustrated the applicability of the invention to industrial machinery.

Figure 1:
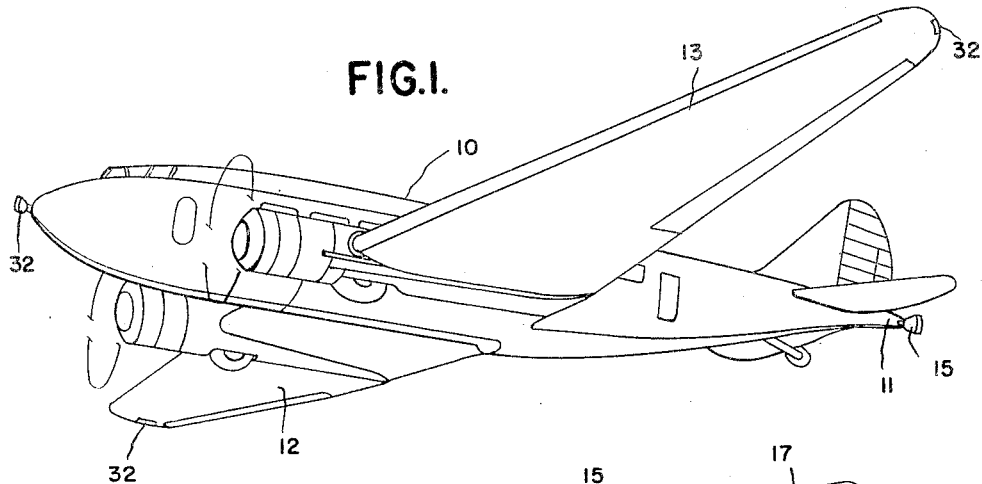
Figure 1 is a perspective view showing an airplane having electric discharge devices constructed in accordance with this invention applied thereto.

Referring first to the embodiment of the invention illustrated in Figures 1 to 5, inclusive, it will be noted that I have shown in Figure 1 a conventional airplane comprising a fuselage 10, a tail cone 11, and a pair of wings 12 and 13. In the event the airplane accumulates an electrical charge in flight, there will be an electrical field around the airplane produced by this electrical charge. This electric field is more concentrated adjacent the most exposed portions of the airplane, such as the wing tips, tail cone, and nose portion of the airplane.

When sufficient electrical field exists adjacent any portion of the airplane in the air surrounding it, a disruptive discharge takes place which appreciably interferes with the radio reception on the airplane. The term "disruptive discharge" used throughout this specification means that type of discharge which is electrically unsteady. This unsteadiness appears in the form of streamers or sparks. The effect of this disruptive discharge is apparent in nearby radios in the form of irregular crashing noises and can be so intense as to render the radio useless.

Figure 2:
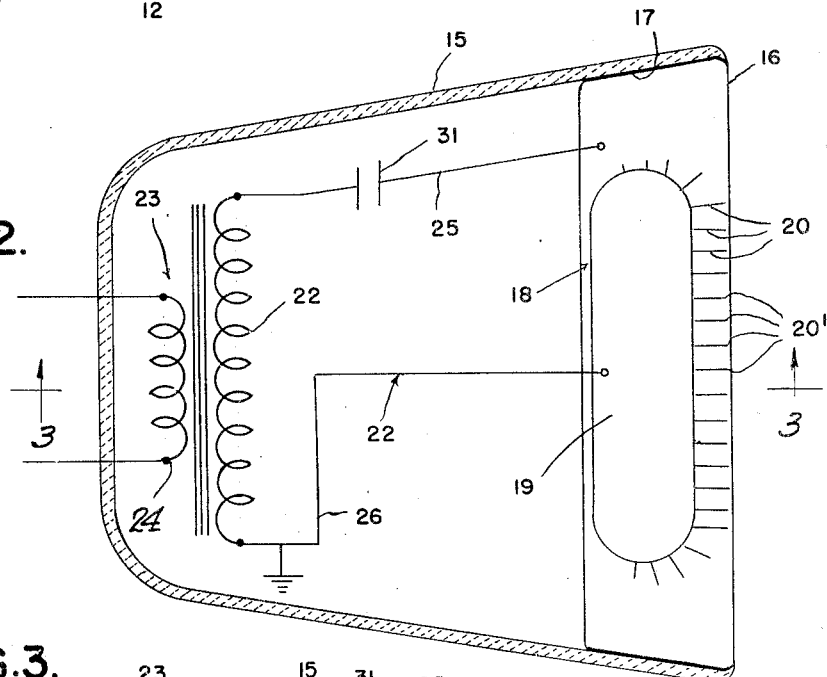
Figure 2 is a semi-diagrammatic view illustrating one form of my improved electric discharge apparatus.
Figure 3:
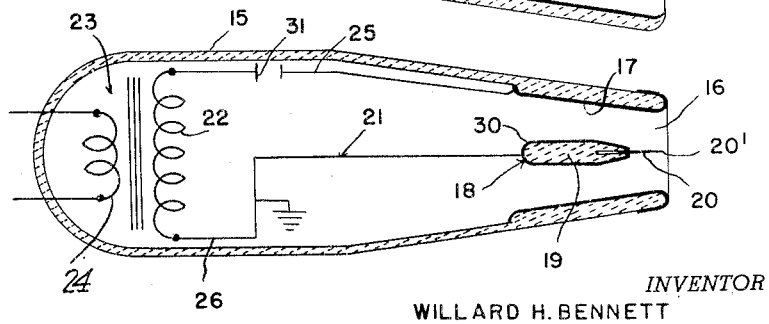
Figure 3 is a semi-diagrammatic sectional view taken substantially on the line 3—3 of Figure 2.
Figure 4:
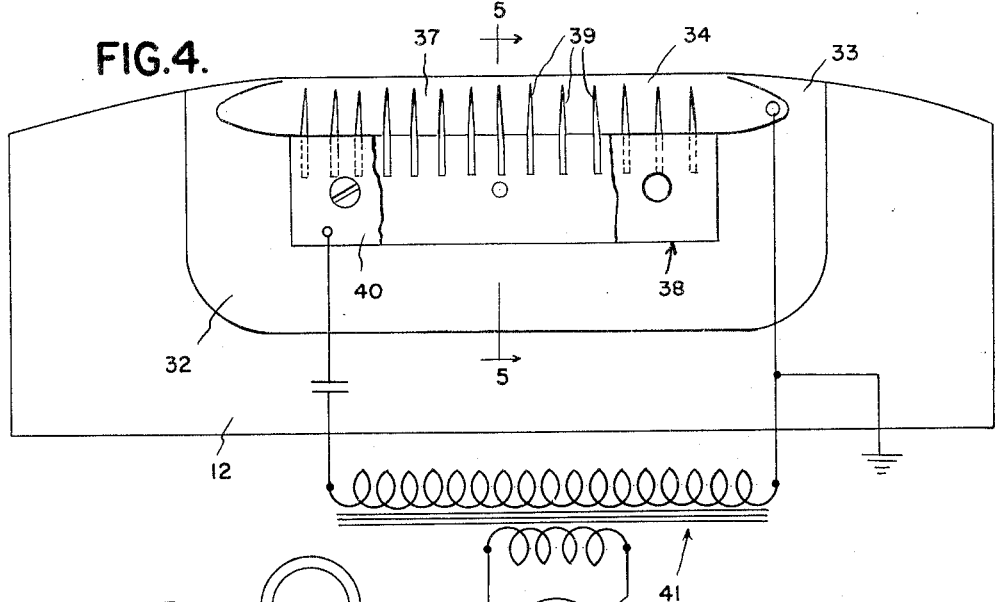
Figure 4 is a semi-diagrammatic elevational view of another form of my improved electric discharge apparatus.
Figure 5:
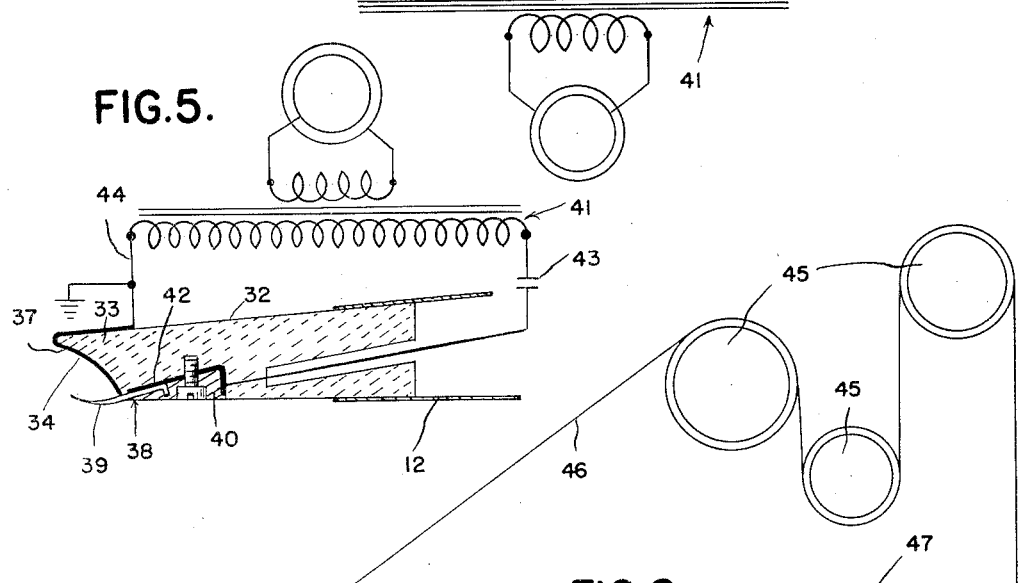
Figure 5 is a semi-diagrammatic sectional view taken on the line 5—5 of Figure 4.

This disruptive form of discharge and the objectionable effects of the latter are overcome by the apparatus shown in Figures 2 to 5, inclusive. The apparatus shown in Figures 2 and 3 is especially designed for installation on the tail cone of the airplane, and the apparatus shown in Figures 4 and 5 is particularly adapted for use on the nose and wing tips. Referring first to Figures 2 and 3, it will be noted that the reference character 15 indicates a casing formed of a dielectric material and having an open end 16. Positioned on the inner surface of the casing 15 adjacent the open end of the latter is a conducting material 17 which forms the collecting electrode.

Although various types of conducting material may be employed, nevertheless, I prefer to use a semi-conducting ink having a certain resistivity. While such practice is not essential to the operation of the apparatus, nevertheless, it tends to make the apparatus less critical or more trouble free and, as a consequence, renders the same commercially practical.

Supported within the casing 15 adjacent the open end of the latter is an emitting electrode 18 comprising a body 19 of dielectric material and a plurality of fine wires or sharp needles 20 imbedded therein. Needles having a rhodium tip of approximately .002 in diameter are satisfactory for this purpose. The emitting electrode 18 is so positioned with respect to the open end of the casing that the extremities of the majority of the needles or fine wires are substantially flush with the open end of the casing. In other words, the ionic field between the pointed ends 20' of the needles 20 and the collecting electrode 17 is rendered readily accessible to the field of static charge so that the path of travel of ions between the two fields is short and direct.

The two electrodes are included in a circuit 21 with the secondary 22 of a high voltage alternating current transformer 23 having a primary 24 connected to a suitable source of electrical energy. Referring more in detail to the circuit, it will be noted that the collecting electrode 17 is connected to one terminal of the secondary by a bus 25 and the other terminal of the secondary is electrically connected to the emitting electrode 18 and to a conducting portion of the airplane through the medium of bus 26. As a result of this arrangement, ionic fields of opposite polarity are produced between the electrodes on successive half cycles and a condenser 31 is connected in the circuit 21 between the collecting electrode 17 and the transformer 23 for the purpose of providing equal amounts of both positive and negative charges on successive half cycles of operation. It may also be pointed out at this time that the individual needles or fine wires 20 are electrically connected to the bus 26 through the medium of a resistance 30. I also prefer to use for this purpose a semi-conducting ink applied over the surface of the dielectric body 19 and having a certain resistivity. The use of a resistance 30 is not critical to the operation of the apparatus but is used in order to render the device more practical from a commercial standpoint.

The apparatus briefly described above in connection with Figure 2 is especially designed for installation on the tail cone portion of the airplane and operates in the following manner. Airplanes in flight have a tendency to acquire static charge, and in those cases where static charge accumulates until the field intensity at the most sharp and exposed portions of the airplane has become approximately 30,000 volts per centimeter, a spontaneous discharge takes place which seriously interferes with the radio reception on the plane. However, in accordance with this invention spontaneous electrical discharges of either polarity from any part of the aircraft is avoided by equipping the aircraft with electric discharge equipment of the type briefly described above. As stated, this equipment produces ionic fields of opposite polarity on successive half cycles of operation and the ions drift from the gap between the electrodes to provide an ionized path from the aircraft to the surrounding atmosphere. With the above in mind, it will be assumed that the aircraft acquires a negative charge of electricity during flight. When this condition exists, the collecting electrode 17 also assumes a negative polarity because it is grounded to the aircraft through the circuit 21 and as a result when the equipment is operated on the negative half cycle, electrons are repelled or drift from the gap between the electrodes. As a result, the difference in potential between the aircraft and surrounding medium is reduced until the charge on the aircraft is neutralized with respect to the surrounding atmosphere or medium. This neutralizing action takes place long before the charge on the aircraft reaches the value required to produce fields of disturbing intensities.

When on the other hand the aircraft acquires a positive charge of electricity, positive ions drift from the gap between the electrodes during the positive half cycle of operation and the potential difference between the aircraft and surrounding medium is accordingly reduced during each positive half cycle of operation until the charge on the aircraft is neutralized. Thus, it will be observed that the electric discharge equipment functions to release or neutralize the electric charge on the aircraft regardless of the polarity of this charge.

The discharge obtained from the above apparatus is for all practical purposes free from the radio interference effects of the disruptive forms of discharge. This results principally from the fact that there is a control of the maximum current density which can occur in the medium between the electrodes. This control is accomplished by the proper spacing of the emitting and collecting electrodes, in conjunction with one or more of the following: (1) maintaining the emitter points at a uniformly small tip diameter; (2) providing each emitter point with a predetermined resistance; and (3) constructing the collecting electrode so that the maximum field at any one point on the collecting electrode is approximately the same as the field over a large portion of that collecting electrode. The latter can be accomplished by controlling the geometrical shape of the collecting electrode or by creating a predetermined surface resistivity on the collecting electrode or a combination of the two.

Owing to the peculiar construction of the apparatus and to the arrangement of the parts thereof, there is produced in the gap between the two electrodes ions of only one polarity at any one time. For example, when the emitter is negative, negative ions are in all portions of the gap except in the immediate vicinity of the sharp points of the emitter. The ions travel at such a velocity that they are cleared out of the gap before the next half cycle has begun during operations at frequencies extending up to the order of magnitude of 3,000 cycles per second. This discharge may be referred to as monopolar with alternating polarities and is free from streamering.

Reference has been made repeatedly to the fact that the construction and arrangement of the electrodes is important in obtaining a nondisruptive streamer free discharge between the electrodes. However, the particular construction and arrangement of the electrodes will vary in dependence upon different applications of the electric discharge device and, to some extent, on the power supplied to the circuit including the electrodes. Therefore, the nature of the invention is not such as to permit defining specific values for the various parts which will afford the maximum efficiency of operation under all applications of the invention. However, an electric discharge device constructed in accordance with the following specifications has been found to produce a nondisruptive discharge which has been found to operate highly satisfactorily in connection with aircraft.

Assuming for the purpose of this description that a 10,000 volt transformer is used in the circuit and that this transformer has an operating output of approximately 200 microamperes when the primary is connected to a 110 volt alternating current source, it has been found that the tips of the emitting electrode needles or wires should be approximately three-fourths of an inch from the collecting electrode. It has also been found that the tip diameter of the emitting electrode needles or wires should be relatively small, and particularly satisfactory results have been obtained in the above construction by forming the needle tips of approximately two thousandths of an inch in diameter. The blocking condenser employed in the circuit to equalize the discharges of opposite polarities may be of a small capacity, and I have found that a 2,000 volt condenser having a .01 microfarad capacity is satisfactory. In addition, I prefer to connect both the emitting electrode and the collecting electrode in the circuit through a resistance which is not critical but which, nevertheless, assists in obtaining a controlled discharge over a long period of use with the minimum attention and, therefore, renders the device commercially practical. In the present instance, the emitting points of the emitter electrode are connected in the circuit through the medium of a semi-conducting ink applied to the dielectric body portion of the emitting electrode, and I have found that a resistance of approximately 40 megohms is satisfactory. The cooperating collecting electrode is connected in the circuit in the same way and I prefer to provide a resistance of approximately 20 megohms in this instance. It may be pointed out at this time that the resistance associated with the collecting electrode assists in obtaining a condition where the maximum field at any one point on the collecting electrode is approximately the same as the field over a large portion of the collecting electrode. This result may also be obtained by forming the collecting electrode with a concaved surface.

As pointed out above, the values referred to herein merely constitute one example of an electric discharge device which has been found to operate satisfactorily in connection with aircraft. In considering these values, it should be understood that the device has many other applications and one or more of these values may have to be altered to suit different conditions. Therefore, the specific values noted above are merely for the purpose of illustration and should not be considered as limiting this invention.

The construction shown in Figures 4 and 5 is particularly designed for installation on the wing tips and nose portion of the airplane. Except for structural differences which are required due to the location of the unit, the operation is identical to the construction shown in Figure 2. In detail, the device shown in Figures 4 and 5 comprises a body 32 of dielectric material of a size which will permit the same to be conveniently installed in the nose of the airplane or in either or both wing tips. The outer portion 33 of the body 32 is provided with a recess 34 in the bottom side thereof shaped to form a concave surface. This surface is coated with a semi-conducting ink and forms a collecting electrode 37. Cooperating with the electrode 37 is an emitting electrode 38 comprising a plurality of sharp pointed needles 39 clamped to the bottom of the body 32 by means of a plate 40 and having the pointed ends directed toward the electrode 37.

In the present instance, the two electrodes are electrically connected to the secondary of a high voltage transformer 41 which may be supported in any suitable manner in the wing. One terminal of the secondary is shown as connected to an aquadag bus extending longitudinally of the plate 40 and electrically connected to the needles through resistive ink 42. A suitable condenser 43 is connected in the circuit between the secondary and emitting electrode. This condenser is for the same purpose as the condenser 31. The other terminal of the secondary is grounded on the wing and is electrically connected to collecting electrode 37 by bus 44. This completes the circuit of the electric discharge apparatus and the operation thereof is identical to the operation of the construction described in Figure 2.

It may be pointed out at this time that when the device is installed in the wing, the emitting electrode is at the underside of the wing tip so that the device does not interfere with a smooth uninterrupted top surface of the wing.

Figure 6:
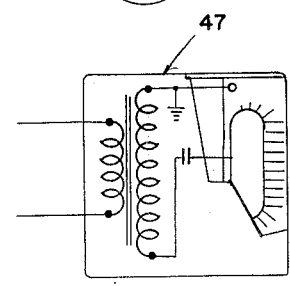
Figure 6 is a diagrammatic view showing the adaptation of the present invention to a commercial machine which possesses a static problem.

In Figure 6 of the drawings, I have illustrated the manner in which an electric discharge device embodying the above principles may be used in connection with industrial machinery to neutralize a charged material passing through the machine. In detail, the machine diagrammatically shown in Figure 6 comprises a plurality of rolls 45 predeterminedly arranged to feed the product 46 through the machine. In the present instance, the product 46 is in the form of fibers which are acted upon in a manner not shown herein as they pass through the machine. In machines of this general type, it is necessary to maintain the fibers in predetermined relationship as they are delivered from the machine. The problem of maintaining the fibers in the desired relationship is aggravated by a static charge imparted to the fibers during their travel through the machine. In accordance with the illustration in Figure 6, the static charge is eliminated by an electric discharge device 47 supported in close proximity to the fibers 46. The device 47 operates to neutralize the charge in the same manner as the apparatus previously described in connection with Figure 2. Assuming, for example, that the fibers passing through the machine are charged positively, it will be noted that during each negative half cycle operation of the electric discharge device 47, electrons in the gap between the electrodes of the device drift to the fibers and neutralize the charge on the latter. On the other hand, when the fibers possess a negative charge, positive charges are released from the gap between the electrodes and drift to the object to neutralize the charge on the latter.

In the embodiment of the invention shown in Figure 6, the non-disruptive form of discharge is highly advantageous in that the fire hazard resultant from sparking and arcing is eliminated as well as the detrimental effects of large amounts of ozone always present with sparking and arcing types of discharge. In the practical application of the apparatus shown in Figure 6, a thirty per cent increase in the efficiency of the machine was recorded. This was due to the fact that my improved electric discharge device enabled the machine to be run at a higher speed without causing disarrangement of the fibers by static charge conditions. Although in Figures 1 to 5, inclusive, an electric discharge device is shown as mounted on an airplane to release a static charge from the airplane and in Figure 6 is shown as mounted in the vicinity of moving charged objects to release the static charges from or neutralize the charge on these objects, nevertheles, in both instances the ions in the vicinity of any static charge move to neutralize that static charge regardless of whether the device is connected to the charged object or to the ground.

What I claim as my invention is:

1. A device for discharging electrficity comprising an electric circuit including a source of electrical energy, an emitting electrode and a collecting electrode connected in said circuit to produce an electrical discharge therebetween, the resistivity of said electrodes to the passage of current therethrough and the size of the emitting portion of the emitting electrode being predetermined to provide a current density in the atmosphere adjacent said electrodes which insures maintaining the electrical discharge between said electrodes below streamering and channelling formation.

2. A device for neutralizing a field of static charge comprising an electric circuit including a source of electrical energy, an emitting electrode and a collecting electrode connected in said circuit to produce ions in the gap between electrodes which the static charge moves in amounts sufficient to neutralize the field, the surface of the collecting electrode opposite the emitting electrode having a resistivity sufficient to prevent ionization in the region immediately adjacent the collecting electrode.

3. A device for discharging electricity comprising a circuit connected to a source of alternating potential, a member having a resistive material on one surface and forming a collecting electrode, an emitting electrode carried by and insulated from electrical contact with said member, said emitting electrode having a tip of relatively small diameter positioned opposite the surface aforesaid of said member in spaced relation to said surface to provide a gap therebetween, said electrodes connected in the circuit aforesaid to provide an electric discharge in the gap of only one polarity at one time and thereby produce ions which drift from the gap to a static field to neutralize the field.

4. A device for discharging electricity comprising a circuit connected to a source of electrical energy, a collecting electrode having a resistive material on one surface electrically connected to the source of electrical energy, an emitting electrode electrically connected to said source of electrical energy through a resistive material and spaced from the resistive surface of the collecting electrode to provide a gap therebetween of sufficient dimension to produce a drift of ions from one electrode to the other.

5. A device for discharging electricity comprising a circuit connected to a source of alternating potential, a member having a concaved surface forming a collecting electrode, an emitting electrode extending to a position adjacent the collecting electrode and having a tip of relatively small diameter spaced from the concaved surface to provide a gap therebetween, said electrodes connected in the circuit aforesaid to provide an electric discharge in the gap of only one polarity at any one time and thereby produce ions which drift from the gap to a static field to neutralize the field.

6. A device for discharging electricity comprising a circuit connected to a source of electrical energy, a hollow collecting electrode having an open side, an emitting electrode supported in the collecting electrode adjacent the open side of the latter and having a relatively fine tip extending to a position in close proximity to a plane including the open side of the collecting electrode, said electrodes connected in the circuit aforesaid to provide ions in the gap between the electrodes which drift from the electrodes to a static field in amounts sufficient to neutralize the field.

7. In a method of neutralizing a field of static charge with an electric discharge device having an emitting electrode and a collecting electrode, those steps which consist in producing an ionic current between the electrodes to provide ions, and positioning the electrodes with reference to the field of static charge so that ions in the gap between the electrodes will drift to the field of static charge to neutralize said field.

8. In a method of discharging electricity with an eletcric discharge device having an emitting electrode and having a collecting electrode, those steps which consist in producing an ionic current between the electrodes, and controlling the maximum current density which occurs in the gap between the electrodes to provide a diffused discharge between the electrodes free from streamering and channelling form.

9. In a method of neutralizing a field of static charge with an electric discharge device having an emitting electrode and a collecting electrode connected in a circuit with a source of alternating current, those steps which consist in producing an electric discharge in the gap between the electrodes of only one polarity at any one time, and positioning the electrodes with reference to the field of static charge so that ions will drift from the gap to the field of static charge in amounts sufficient to neutralize the field.

10. In a method of neutralizing a field of static charge with an electric discharge device having an emitting electrode and a collecting electrode connected in a circuit with a source of electrical energy, those steps which consist in producing an electric discharge in the gap between the electrodes, positioning the electrodes with reference to the field of static charge so that ions will drift from the gap between the electrodes to the field of static charge in amounts sufficient to neutralize the field, and controlling the maximum current density which occurs in the gap between the electrodes to provide a diffused discharge between the electrodes.

11. In a method of neutralizing a field of static charge, those steps which consist in effecting an electric discharge of alternating polarity between an emitting electrode and a collecting electrode, controlling the electric discharge between the electrodes to provide equal amounts of each polarity on successive half cycles of the electric discharge and positioning the electrodes relative to the field to cause sufficient ions of either sign to drift from the electrodes to the field of static charge to neutralize the field regardless of the polarity of the static charge in the field.

WILLARD H. BENNETT.